UNITED STATES PATENT OFFICE.

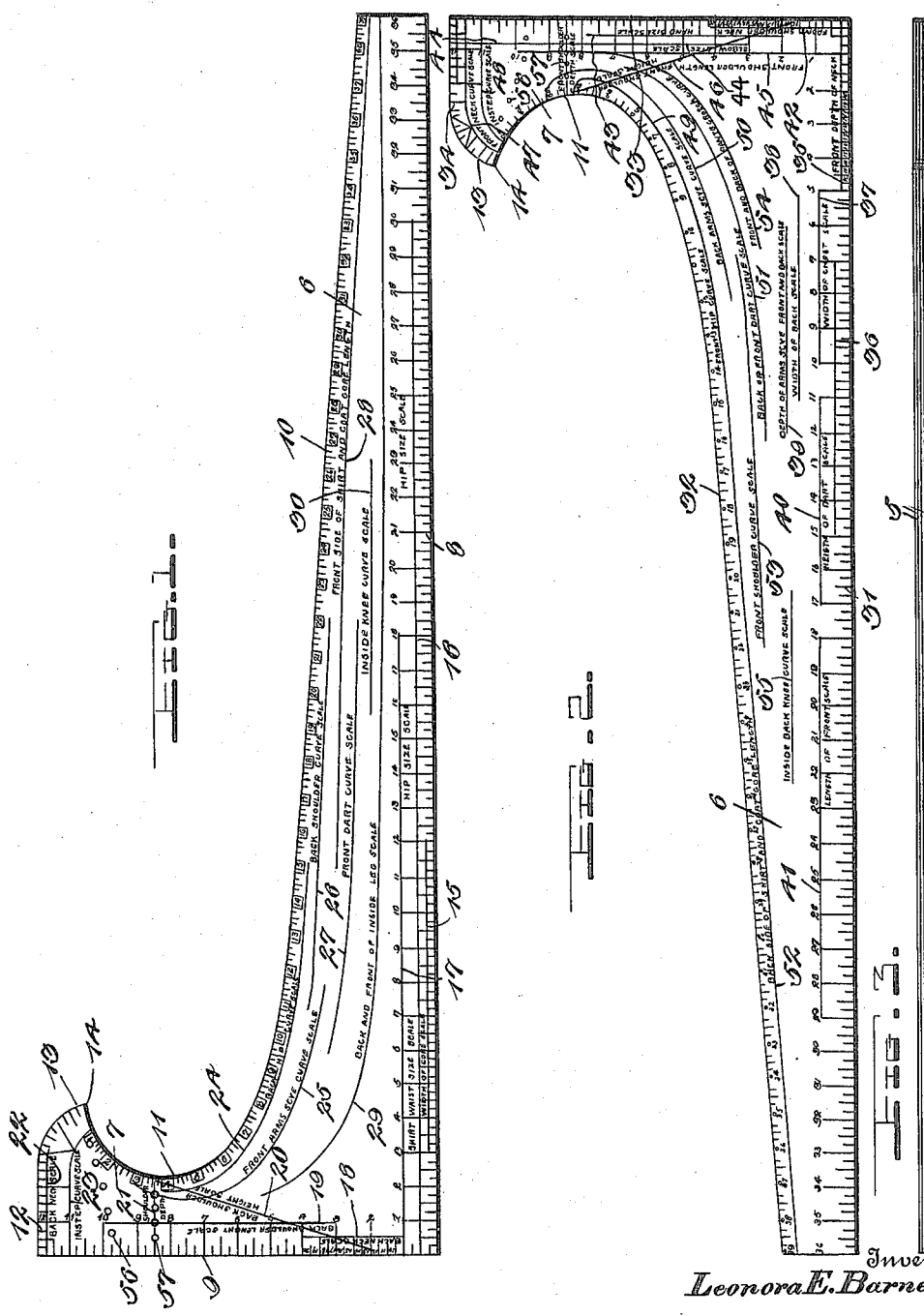

LEONORA E. BARNES, OF LINCOLN, NEBRASKA.

TAILOR'S RULE.

1,158,425.  Specification of Letters Patent.  Patented Nov. 2, 1915.

Application filed April 8, 1912, Serial No. 689,296. Renewed December 3, 1913. Serial No. 804,517.

*To all whom it may concern:*

Be it known that I, LEONORA E. BARNES, a citizen of the United States, residing at Lincoln, in the county of Lancaster and State of Nebraska, have invented certain new and useful Improvements in Tailors' Rules, of which the following is a specification, reference being had to the accompanying drawings.

This invention relates to tailors' rules and has for its object to provide a device of this character whereby various measurements may be taken from the human form and the lines upon which the garment is to be cut quickly and accurately delineated to produce the necessary pattern.

One of the further objects of the present invention is to provide a rule of the above character whereby instructions in the art of tailoring may be imparted so that the pupil may become quickly acquainted with the necessary measurements and the manner in which the same are to be obtained.

A further object of the invention resides in the provision of a tailor's rule constructed of laminated flexible material whereby the rule may be laid closely against the body, and the measurements accurately taken therefrom.

With the above and other objects in view, the invention consists of the novel features of construction, combination and arrangement of parts hereinafter fully described and claimed, and illustrated in the accompanying drawings, in which—

Figure 1 is a side elevation of a tailor's rule embodying my improvements; Fig. 2 is a similar view of the opposite side of the rule; and Fig. 3 is an edge view.

Referring in detail to the drawing and more particularly to Fig. 3 thereof, it will be observed that my improved rule consists of a plurality of superposed layers or laminations of flexible cardboard indicated at 5, said layers of cardboard being glued or otherwise adhesively secured together. Each of these cardboard layers is of the same form in outline whereby a flexible rule is produced consisting of a long tapering arm 6 and a short arm 7 extending at right angles from one end of the longer arm. The arm 6 is preferably 36 inches in length and is provided upon its straight edge with the scale graduations 8 indicating inches and fractional parts thereof. The straight edge of the shorter arm 7 of the rule is also provided with a scale 9 while the tapering edge of the rule is provided with scale graduations 10. This tapering edge of the rule is curved as indicated at 11 in the form of a semicircle and forms one of the side edges of the shorter arm 7. The end edge of this shorter arm is also graduated as indicated at 12 and said edge is curved inwardly as at 13 to meet the curved edge 11 thereby forming a tapering pointed portion 14 at the end of the shorter arm 7. Upon the face of the rule various guide lines are printed or otherwise designated to indicate certain portions of the graduated edges of the rule which are to be employed in obtaining measurements from the various parts of the human form. These measurements are also printed upon the rule adjacent to the respective guide lines as shown in Figs. 1 and 2. I will now proceed to describe in detail the manner in which the measurements for the cutting of ladies' or gentlemen's garments are obtained.

The line 15 extending in parallel relation to the straight edge of the longer arm 6 of the rule indicates the scale upon which the width of the gores of a waist are to be taken, and the line 16 also extending in parallel relation to the straight edge of the arm 6 indicates that portion of the scale which is used in determining the size of the waist of the party being measured. A line 17 also extends along the graduated edge of the arm 6 and upon said line the measurement around the hips is taken. This measurement is taken by placing the edge of the scale at one end of the line 17 at the center and in front between the hips, and then passing the scale around one of the hips to a point at the center and at the back of the person being measured, thereby obtaining the desired measurement for each hip of the garment. These lines are sufficiently long to permit of the application of the rule to persons of various sizes or builds.

Along the straight edge of the shorter arm 7 and at the end of the long arm 6, a line 18 is provided upon which the measurements at the back of the neck are taken. Between the ends of this line and on the graduated edge of the arm 7 the numerals from 10 to 20 inclusive are printed. A line 19 extends along this shorter edge of the rule and indicates the length of the shoulder. A diagonal line 20 extends from a point on the back neck of the scale 16 on the straight edge of the short arm 7 to the inner end of a line connecting a series of perforations 57 which will be later referred to upon the curved edge 11 thereof and is used in determining the height of the back portion of the shoulder. A line 21 extends across the short arm 7 of the rule between the eight and one half inch mark on the straight edge thereof and the three and one-half inch mark on the curved inner edge thereof and is used in finding the depth of the shoulder. The graduations on the end edge of the short arm 7 are provided with guide lines 22 and 23, the first of which is used in measuring the back of the neck and the second in finding the curve of the instep.

The inclined graduated inner edge 10 of the rule and the curved edge 11 have a combined length of thirty-nine inches and the graduations thereon are so designated by means of suitable numerals, reading from the tapered or pointed end 14 to the extreme smaller end 6. A line 24 extends along this inner graduated edge of the rule between the four and fifteen-inch index marks and indicates that portion of the edge of the rule upon which the measurements of the back of the hip are taken. A second line 25 extends from the numeral 3 to the numeral 12 and upon this portion of the scale the front arm scye curve is found. A line 26 extends from the numeral 11 to the numeral 22 and indicates the scale portion upon which the back shoulder curve is found. A line 27 extending between the numerals 10 and 22 on the graduated edge of the rule indicates the front dart curve and the line 28 extending from the numeral 15 to the extreme smaller end edge of the rule indicates that portion of the scale upon which the front side of the skirt and coat gore is determined and is used to produce the proper length and curve of the coat or skirt. The line 29 which extends from a point opposite the numeral 6 on the inner curved edge 11 of the rule to the extreme narrower end of the arm 6 indicates the scale portion upon which the curve of the legs of gentlemen's trousers, pajamas and similar garments is to be found. A line 30 extending between the numerals 19 and 26 on the inner edge of the arm 6 is used to shape the legs of garments at the inside of the knee and to find the proper curve thereof.

Referring now to Fig. 2 in which the opposite side of the rule is shown, the same is provided upon the outer edge of the longer arm 6 with the scale graduations 31 and upon its inner edge with the graduations 32 while the shorter arm 6 is provided upon its outer and end edges with the scales 33 and 34 respectively. The longer arm 6 at one end is provided with a line 35 extending in parallel relation to the graduated edge thereof upon which the measurement of the depth of the front of the neck is taken, the numerals from 10 to 20 inclusive being printed upon this portion of the scale. The line 36 extends from figure 7 on the outer end of the edge of the rule to the figure 15 and indicates the portion of the scale upon which the measurements of the bust are taken. The line 37 extending from the five-inch graduation to the ten-inch mark indicates the scale portion which is employed to find the width of the chest while the line 38 indicating the scale to be employed to find the width of the back extends from the numerals 5 to 11. The line 39 is for the purpose of finding the depth of the arm scye at the front and back. The scale line 40 is employed to find the height of darts used in various garments. A line 41 is provided along the straight edge of the rule upon which the length of the front of waists, coats or vests is determined.

Upon the scale 33 on the outer edge of the shorter arm 7 of the rule a scale line 42 is designated upon which the measurement around the neck in front of the shoulder is taken, the numerals 10 to 20 inclusive being arranged on said graduated edge between which the measurement is taken. The line 43 indicates a scale portion which is employed for finding the width and length of the hand and extends from the two-inch mark to the eight-inch mark. The line 44 indicates that part of the scale upon which the measurement around the elbow is taken. A line 45 extending from the long straight edge of the rule in parallel relation to the short outer edge thereof indicates that portion of the scale 33 which is used in finding the length of the front shoulder. A diagonal line 46 extends through the numeral 12 of the front neck scale on the shorter edge of the rule to the numeral 4 at the central part of the curved inner edge 11 thereof. This line provides a scale upon which the height of the front shoulder is found. The front and back shoulder heights are determined in the same manner, by the use of the oblique guide lines 20 and 46 upon the opposite sides of the rule. In laying out the pattern for the garment, the draft is made of only one side thereof, and all measurements are taken from the center of the neck at the back or front, as base or starting points. Assuming that it has been determined, by actual measurement upon the body of the person, that the distance from the waist line to the shoulders is 13 inches, in laying off this point on the pattern, the rule is arranged on the paper with the outer corner thereof at the juncture of the short and long arms, on the point indicating the center of the neck at the back. The oblique line 20 is then followed upon the pattern sheet to a point indicating the height of the back shoulder, for which purpose the series of openings 57 are provided. It will be understood that the short arm of the rule may be provided with a number of parallel rows of such openings and in one of the openings in the row which intersects the shoulder length scale 19 at the point thereon indicating the length of the shoulder as taken upon the body of the person, a pencil is engaged and a mark made upon the pattern sheet. In accordance with the purpose of the designer to provide a tight or loose garment, one of the openings 57 nearer to or farther from the curved edge 11 indicating the arm hole, will be selected as the point indicating the depth of the shoulder. This point is then connected to the point on the pattern chart indicating the back neck length, by a line which is indicative of the cut of the material. In ascertaining the line upon which the material should be cut for the front shoulder height of the garment, the same procedure is followed. On the graduated end edge of the shorter arm 7 of the rule a scale line 47 is provided upon which the curve of the front of the neck is found, said line extending in parallel relation to the straight and curved end edge 13 of the rule. A second line 48 is also provided on this end of the rule and is used to produce the instep curve.

A line 49 extends in parallel relation to the inclined inner edge of the longer arm 6 and in concentric relation to the curved edge 11 and indicates the curve of the front of the hip, said line extending between the numerals 4 and 15. The line 50 extending from the numeral 3 to the numeral 12 indicates the scale upon which the curve of the scye of the back part of the arm is found. A line 51 is provided upon which the back and front dart curves are measured. A line 52 extends in parallel relation to the inner edge of the longer arm 6 of the rule and from the numeral 15 thereof to the extreme narrower end of said arm and indicates the scale upon which the curve of gores in skirts and coats over the hip is found. A line 53 is also provided and extends from the numeral 11 to the numeral 22 on the inner edge of the rule between which the curve of the front shoulder is measured. The proper curve for the front and back of trousers and similar garments is found upon the scale line 54 and the line 55 provides a guide for measuring the curve of the knee. It will be understood that these various lines may be of greater or less length than hereinbefore stated, in order that the device may be used for drafting garments for both adults and children.

The lines 28, 30, 35, 37, 38, 39, 40 and 55 which are not provided with graduations are simply for the purpose of guiding the user and indicating certain portions of the graduated edges of the scale which should be used in obtaining certain specified measurements.

A line of small openings 56 extend across the end of the shorter arm 7 of the rule from the pointed end 14 thereof to the opposite graduated edge and are provided for the purpose of making guide marks whereby caps or other garments may be provided with fancy stitching in various designs. A second row of holes or apertures 57 are also provided upon the scale line 21 and are used for setting the scale for the drafting of trimmings.

From the foregoing it is believed that the construction and manner of use of my improved rule will be fully understood. The device may be used in the drafting of ladies' waists, skirts and coats, children's garments of all kinds, including hats, caps and leggings, also gentlemen's garments and parasols and umbrellas. The device is also adapted for use in the cutting of ladies' tailored corsets. The particular feature of the device, however, resides in the provision of the short angularly disposed arm 7 having the curved end edge 13 whereby an accurate determination of the measurements of the neck may be obtained. By means of the device, garments may be easily and quickly provided and instruction can be also readily imparted to others in the art of tailoring. Owing to the pliability of the rule, it will be seen that it can be closely applied to the body of the person being measured so that very accurate measurements are obtained.

Having thus described the invention what is claimed is:—

A tailor's rule comprising a body made up of laminated sheets of flexible material, said body consisting of a long tapering arm and a short arm extending at right angles from the wider end of said long arm, the inner edge of said short arm being curved and merging into and forming a continuation of the inner edge of the long arm, the end edge of said short arm curving inwardly to meet the inner curved edge of the short arm and form an inwardly extending pointed termination on the short arm, said body having scale graduations upon its opposite faces upon both the inner and outer edges thereof and the curved end edge of the short arm, and guide lines delineated upon the face of the rule and extending between certain points of the scales on the edges thereof to indicate different portions of the scales to be employed in obtaining the measurements of different parts of the human form.

In testimony whereof I hereunto affix my signature in the presence of two witnesses.

LEONORA E. BARNES.

Witnesses:
R. E. BARNES,
E. T. GURNOW.

Copies of this patent may be obtained for five cents each, by addressing the "Commissioner of Patents, Washington, D. C."